(12) United States Patent
Okabe (10) Patent No.: US 7,695,384 B2
(45) Date of Patent: Apr. 13, 2010

(54) BELT DEVICE AND IMAGE FORMING APPARATUS

(75) Inventor: Yasushi Okabe, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1170 days.

(21) Appl. No.: 10/948,321

(22) Filed: Sep. 24, 2004

(65) Prior Publication Data

US 2005/0070386 A1 Mar. 31, 2005

(30) Foreign Application Priority Data

Sep. 30, 2003 (JP) .............................. 2003-339670

(51) Int. Cl.
*F16H 7/18* (2006.01)
*F16H 7/22* (2006.01)

(52) U.S. Cl. ...................................... 474/140; 474/122

(58) Field of Classification Search ................. 474/140, 474/122, 144, 101, 111, 112, 119, 131–138; 399/303, 313, 162, 165; 219/216
See application file for complete search history.

(56) References Cited

U.S. PATENT DOCUMENTS

| | | | | |
|---|---|---|---|---|
| 1,615,544 A | * | 1/1927 | Hutchison | 474/85 |
| 3,657,779 A | * | 4/1972 | Granberry | 198/842 |
| 4,577,527 A | * | 3/1986 | Shackelford | 74/640 |
| 4,642,073 A | * | 2/1987 | Ancarani Restelli | 474/111 |
| 5,017,969 A | * | 5/1991 | Mitomi et al. | 399/299 |
| 5,117,970 A | * | 6/1992 | Gibbs | 198/842 |
| 5,164,777 A | * | 11/1992 | Agarwal et al. | 399/165 |
| 5,659,850 A | * | 8/1997 | Reeder et al. | 399/165 |
| 6,160,978 A | * | 12/2000 | Tsuruoka et al. | 399/165 |
| 6,397,033 B1 | * | 5/2002 | Todome | 399/303 |
| 6,599,209 B1 | * | 7/2003 | Ullein et al. | 474/111 |
| 6,733,407 B2 | * | 5/2004 | Wakana | 474/92 |
| 7,136,611 B1 | * | 11/2006 | Murase | 399/165 |
| 7,245,857 B2 | * | 7/2007 | Ishii et al. | 399/162 |
| 2006/0159489 A1 | * | 7/2006 | Ishii et al. | 399/165 |
| 2007/0223978 A1 | * | 9/2007 | Ishii et al. | 399/329 |

FOREIGN PATENT DOCUMENTS

JP A 2001-163424 6/2001

* cited by examiner

*Primary Examiner*—Bradley T King
*Assistant Examiner*—Thomas Irvin
(74) *Attorney, Agent, or Firm*—Oliff & Berridge, PLC (57) ABSTRACT

A belt device that is provided with an endless belt having a projection on an inner surface of the endless belt, the projection extending parallel to a running direction of the endless belt; and a support roller having a guide member that contacts the projection, the support roller supporting the endless belt so as to run the endless belt, wherein the guide member is separately provided from the support roller and nonrotatably supported between the support roller and the projection.

11 Claims, 7 Drawing Sheets

BELT DEVICE AND IMAGE FORMING APPARATUS

INCORPORATION BY REFERENCE

This application claims priority from JP 2003-339670, filed Sep. 30, 2003, the subject matter of which is incorporated herein in its entirety by reference thereto.

BACKGROUND OF THE INVENTION

1. Field of Invention

The invention relates to a belt device that supports an endless belt with a support roller so as to run, and an image forming apparatus provided with the belt device.

2. Description of Related Art

There exists an image forming apparatus that includes a belt device that transports a recording medium on an endless belt inside the image forming apparatus. As disclosed in, for example, Japanese Laid-Open Patent Publication No. 2001-163424, a belt device includes a protrusion that is provided on an inner surface of an endless belt. The protrusion extends along a running direction of the endless belt to prevent the endless belt from being out of position while the endless belt is running.

However, in the belt device, the protrusion formed on the endless belt runs onto a support roller supporting the endless belt while the endless belt is running. To solve such a problem, the belt device disclosed in Japanese Laid-Open Patent Publication No. 2001-163424 includes a rotating member that has a tapered surface and is disposed concentrically with the support roller and is provided between the protrusion and the support roller. As the tapered surface of the rotating member contacts the protrusion, meandering of the endless belt is restricted and the protrusion is prevented from running onto the support roller.

In the belt device, meandering of the endless belt while the belt is running under normal conditions is restricted by the rotating member having the tapered surface. However, when an external force is applied to the endless belt, the protrusion runs onto the rotating member along the tapered surface of the rotating member while the rotating member is being rotated. Thus, the protrusion readily runs onto the rotating member.

SUMMARY OF THE INVENTION

Accordingly, one exemplary aspect of the invention is to provide a belt device including an endless belt supported with a support roller so as to run. Another exemplary aspect of the invention is to provide a belt device in which a protrusion formed on the endless belt is prevented from running onto the support roller supporting the endless belt even when an external force is applied to the endless belt.

In accordance with an exemplary aspect of the invention, a belt device is provided with an endless belt having a projection on an inner surface of the endless belt, the projection extending parallel to a running direction of the endless belt; and a support roller having a guide member that contacts the projection, the support roller supporting the endless belt so as to run the endless belt, wherein the guide member is separately provided from the support roller and nonrotatably supported between the support roller and the projection.

In accordance with another exemplary aspect of the invention, a belt device is provided with an endless belt having a projection on an inner surface of the endless belt, the projection extending parallel to a running direction of the endless belt; and a support roller having a guide member that contacts the projection, the support roller supporting the endless belt so as to run the endless belt, wherein the guide member is separately provided from the support roller and is movable toward an upstream side of the endless belt where the projection first contacts the guide member.

In accordance with another exemplary aspect of the invention, a belt device is provide with an endless belt having a projection on an inner surface of the endless belt, the projection extending parallel to a running direction of the endless belt; and a support roller having a guide member that contacts the projection, the support roller supporting the endless belt so as to run the endless belt. The guide member includes a rotating member that has at least two diameter portions with a larger diameter substantially equal to a diameter of the support roller, the rotating member being disposed between the support roller and the projection such that a center of the larger diameter of the rotating member is disposed on a rotating axis of the support roller; and a supporting member that is separately provided from the support roller, the supporting member rotatably supporting the rotating member at an angle such that distance between the projection and the rotating member becomes gradually shorter toward the running direction of the endless belt.

BRIEF DESCRIPTION OF THE DRAWINGS

Exemplary embodiments of the invention will be described in detail with reference to the following figures in which like elements are labeled with like numbers and in which.

DETAILED DESCRIPTION OF PREFERRED EMBODIMENTS

Exemplary embodiments of the invention will be described in detail with reference to the accompanying drawings.

Figure 1:
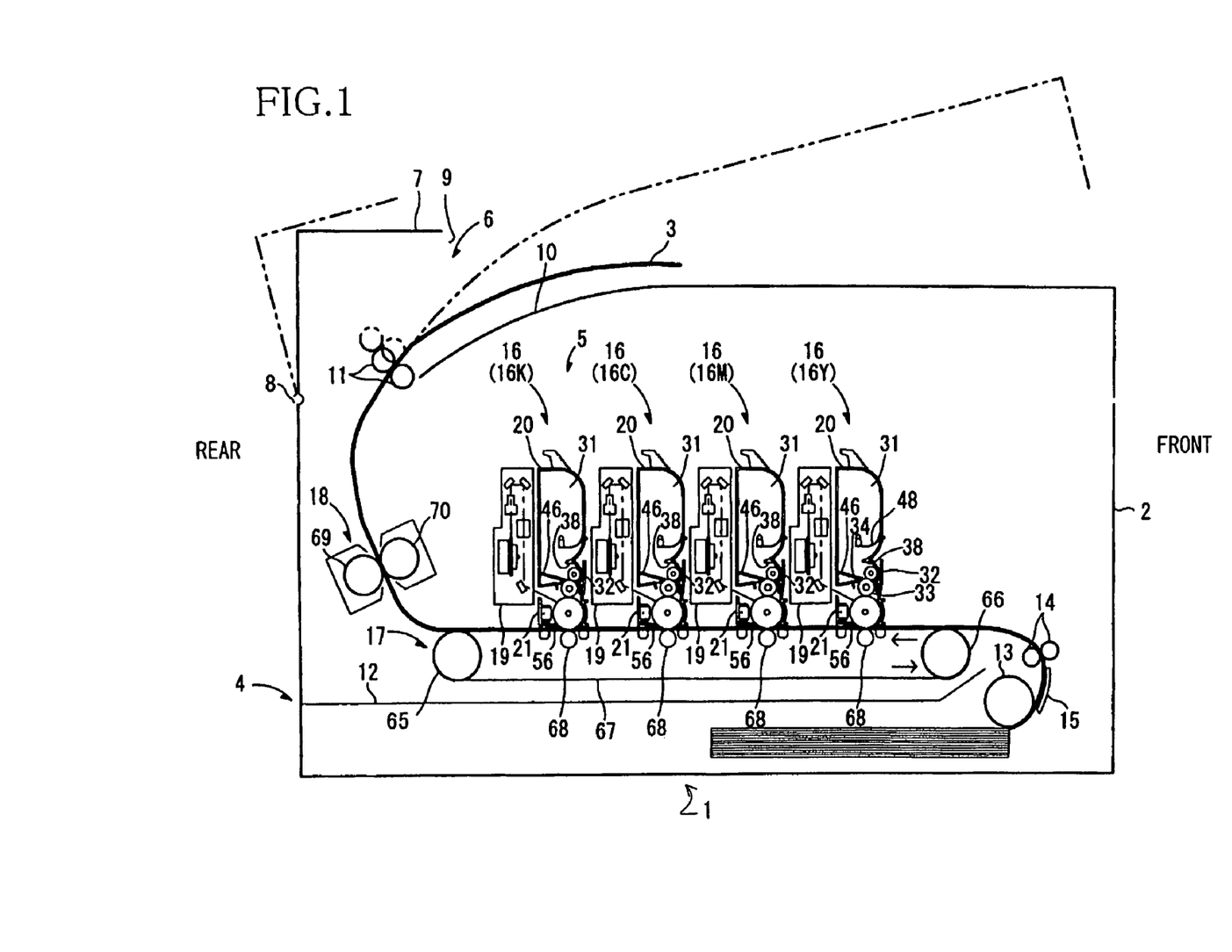
FIG. 1 is a side sectional view showing an essential portion of a laser printer as an image forming apparatus according to an embodiment of the invention.

In FIG. 1, a color laser printer 1 is a tandem color laser printer in which a plurality of process units 16 are arranged in tandem with each other in a horizontal direction (left and right side direction in FIG. 1). The color laser printer 1 includes, in a main casing 2, a sheet feeding unit 4 that supplies a sheet 3 (recording medium), an image forming unit 5 that forms an image on the sheet 3, and a sheet discharge unit 6 that discharges the sheet 3 having an image formed thereon.

The main casing 2 has a substantially rectangular box shape that is open upwardly. A top cover 7 is provided at an upper side of the main casing 2. The top cover 7 is pivotally supported about a hinge 8 at a rear side (left side in FIG. 1) of the main casing 2, to open or close the main casing 2, as indicated by a double dashed chain line and a solid line.

The top cover 7 is provided with a sheet discharge port 9 that discharges the sheet 3 therethrough, a sheet discharge tray 10 that stacks thereon the sheets 3 discharged through the sheet discharge port 9, and discharge rollers 11 provided at a rear end portion of the sheet discharge tray 10 in the sheet discharge port 9. The sheet discharge port 9, the sheet discharge tray 10, and the discharge rollers 11 are moved together with the top cover 7 when the top cover 7 is opened or closed.

The sheet feeding unit 4 is provided at a bottom portion in the main casing 2, and includes a sheet supply tray 12, a pick-up roller 13, and conveying rollers 14. The sheet supply tray 12 is detachably attached to the main casing 2 from the front side in a horizontal direction. The pick-up roller 13 is disposed on an upper portion of the sheet supply tray 12 at one end (front side). The conveying rollers 14 are provided downstream of the pick-up roller 13 in a sheet feeding direction.

In the sheet supply tray 12, the sheets 3 are stacked. An uppermost sheet 3 is supplied one by one toward the conveying rollers 14 upon the rotation of the pick-up roller 13. Then, the sheet 3 is conveyed from the conveying rollers 14 to a transfer position between an endless belt 67 and each photosensitive drum 56.

A guide member 15 is provided between the pick-up roller 13 and the conveying rollers 14 in a vertical direction in FIG. 1. The sheet 3 fed by the pick-up roller 13 is guided to the conveying rollers 14 by the guide member 15.

The image forming unit 5 includes the process units 16, a belt section 17 as a belt device, and a fixing section 18. The process unit 16 is provided in association with each of a plurality of toner colors. More specifically, the process units 16 include a yellow process unit 16Y, a magenta process unit 16M, a cyan process unit 16C, and a black process unit 16K. The process units 16 are sequentially disposed at a specified distance therebetween so as to align with each other in the horizontal direction.

Figure 2:
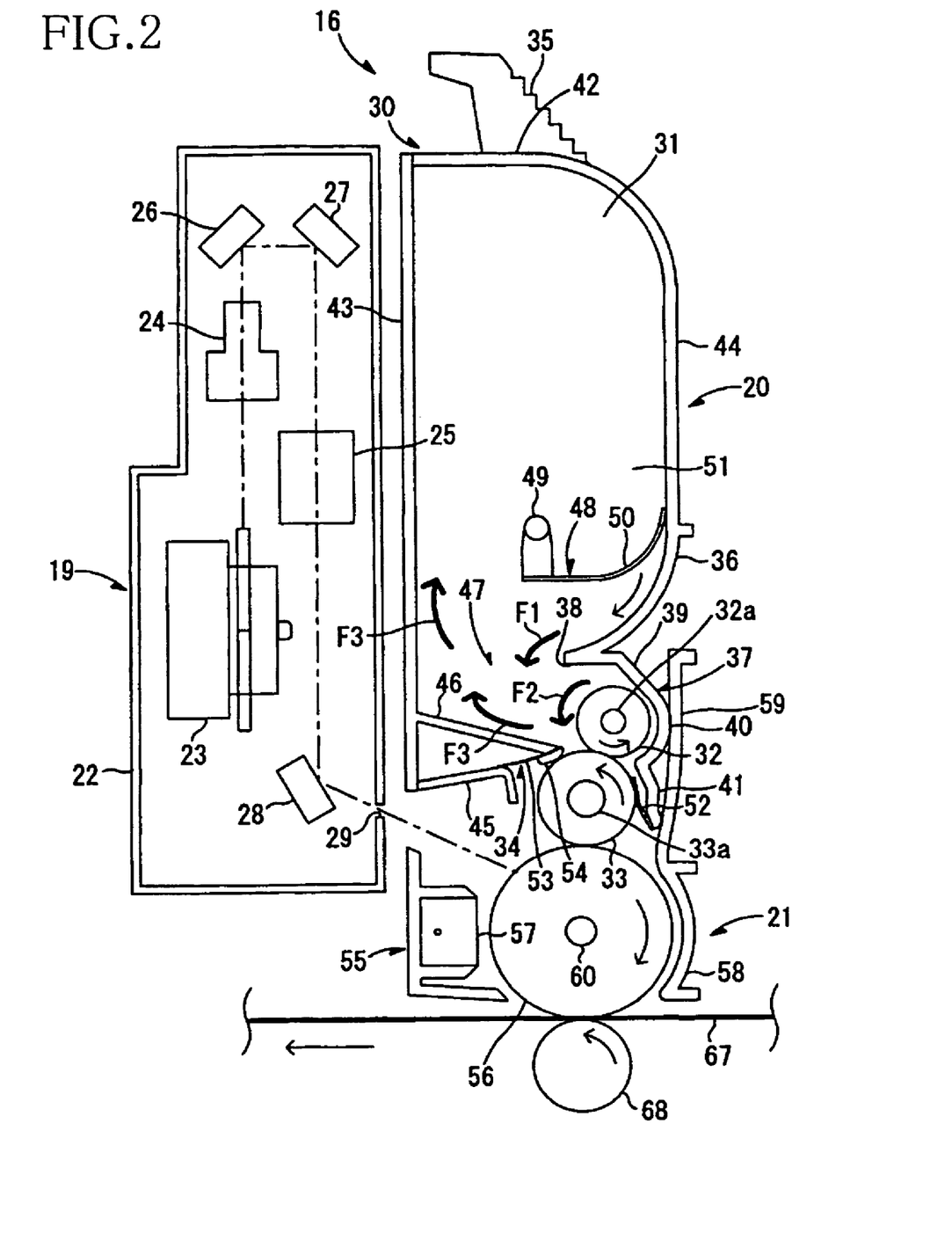
FIG. 2 is a side sectional view of a process unit of the printer showing an internal structure of the process unit.

The process units 16 will be described in detail below with reference to FIG. 2. As shown in FIG. 2, each process unit 16 includes a scanner unit 19, a developing unit 20, and a photosensitive drum unit 21.

Each scanner unit 19 is disposed at a specified distance away from the endless belt 67 in a vertical direction, and is fixed to the main casing 2. Each scanner unit 19 is provided with a laser emitting portion (not shown), a polygon mirror 23, two lenses 24, 25, and three reflecting mirrors 26, 27, 28, in a scanner casing 22.

The scanner casing 22 has a substantially rectangular box shape. The scanner casing 22 is fixed to the main casing 2 with its longitudinal direction orientated in the vertical direction in FIG. 2. A window 29, through which a laser beam is emitted, is formed on a wall of the scanner casing 22 facing the photosensitive drum unit 21.

In the scanner unit 19, a laser beam emitted from the laser emitting portion, based on image data, sequentially passes through or reflects off the polygon mirror 23, the lens 24, the reflecting mirrors 26, 27, the lens 25, and the reflecting mirror 28 in this order, and is emitted from the window 29 to the photosensitive drum 56, as shown by a dashed line of FIG. 2. The laser beam scans across the photosensitive drum 56 at a high speed.

Each developing unit 20 is detachably attached to the main casing 2. Each developing unit 20 is provided with a toner chamber 31, a supply roller 32, a developing roller 33, and a layer thickness regulating blade 34 in a development casing 30.

As shown in FIG. 2, the development casing 30 has a substantially rectangular box shape that is open downwardly. Provided on a top wall 42 is a holding part 35 for holding the development casing 30, for example, when a user exchanges the development casing 30. The holding part 35 is formed to protrude upward from the top wall 42 of the development casing 30 in the form of a substantially triangle shape when viewed from a side. A front face of the holding part 35 is formed in a saw-toothed shape so to enable a user to securely grip the holding part 35.

A rear wall 43 of the development casing 30 is formed into a substantially flat surface. The rear wall 43 is disposed parallel to a front wall of the scanner casing 22, that is also formed into a substantially flat surface.

A front wall 44 of the development casing 30 is formed such that an upper end portion of the front wall 44 is curved to join with the top wall 42. A middle of the front wall 44, between top and bottom end portions of the front wall 44, is formed parallel to the rear wall 43, into a substantially flat surface. A lower end portion of the front wall 44 is an agitator facing wall 36 that faces an agitator 48 provided in the toner chamber 31. The agitator facing wall 36 is formed in a curve (downward and rearward) along a rotation path of the agitator 48.

A cover wall 37 that covers the supply roller 32 and the developing roller 33 is formed at a lower location than the agitator facing wall 36 in the front wall 44 of the development casing 30.

The cover wall 37 forwardly turns continuously from the rear end portion of the agitator facing wall 36 which extends in a curve rearward in a side sectional view. The cover wall 37 is made up of a supply roller upper wall portion 38, a supply roller inclined wall portion 39, a supply roller front-side cover wall portion 40, and a developing roller front-side cover wall portion 41, which are integrally formed. The supply roller upper wall portion 38 extends frontward in a horizontal direction. The supply roller inclined wall portion 39 continues from the front end portion of the supply roller upper wall portion 38, and extends obliquely frontward and downward. The supply roller front-side cover wall portion 40 continues from the front end portion of the supply roller inclined wall portion 39, and extends in a curve along an outer surface of the supply roller 32 (with the top and bottom ends of the wall portion 40 disposed rearward and the middle disposed frontward in a side sectional view). The developing roller front-side cover wall portion 41 extends obliquely frontward and downward continuously from the rear end portion of the supply roller front-side cover wall portion 40, which extends in a curve rearward.

The supply roller upper wall portion 38 and the supply roller inclined wall portion 39 cover the upper portion of the supply roller 32 between the toner chamber 31 and the supply roller 32. More specifically, the supply roller upper wall portion 38 and the supply roller inclined wall portion 39 are disposed near the supply roller 32 such that a plane of the projection of the supply roller upper wall portion 38 and the supply roller inclined wall portion 39 in the vertical direction covers an entire roller portion of the supply roller 32. In other words, the rear end of the supply roller upper wall portion 38 is positioned further rearward than the rear portion of the supply roller 32.

A blade support wall 45 extends slightly obliquely upward toward the front, from the lower end portion of the rear wall 43 of the development casing 30. The blade support wall 45 is joined to the rear wall 43. The blade support wall 45 is bent, so that a free end (front side end) thereof faces the rear-side surface of the developing roller 33.

Provided near the lower end portion of the rear wall 43 of the development casing 30 is a guide wall 46 that extends slightly obliquely downward toward the front, so as to cover the blade support wall 45 from above. More specifically, the rear end of the guide wall 46 extends from the rear wall 43, to dispose the front end of the guide wall 46 above the developing roller 33 near a position where the developing roller 33 and the layer thickness regulating blade 34 face each other. Thus, the guide wall 46 is disposed to cover the blade support wall 45 and the layer thickness regulating blade 34 from above, with its front end portion near the developing roller 33 inclined downward, and its rear end portion far from the developing roller 33 inclined upward relative to a horizontal direction.

The guide wall 46 is a flat surface and is provided across the entire width of the development casing 30 (along a direction perpendicular to the front and rearward direction when the printer 1 is viewed from the top).

The development casing 30 is made of, for example, polyethylene resin. The rear wall 43 and the guide wall 46 are formed integrally. The top wall 42, the front wall 44 (including the agitator facing wall 36 and the cover wall 37), the blade support wall 45, and side walls 51 disposed in confrontation with each other to extend toward the rear wall 43 from an end of the front wall 44 in the width direction thereof, are also formed integrally. A rear end portion of the top wall 42 and rear end portions of the side walls 51 are welded to the upper end portion and side portions of the rear wall 43, respectively. A rear end portion of the blade support wall 45 is welded to a lower end portion of the rear wall 43. The development casing 30 is thus formed.

In the development casing 30, an upper internal space from the top wall 42 to the lower end portion of the agitator facing wall 36 (that is, the rear end portion of the agitator facing wall 36 that is continuously joined to the supply roller upper wall portion 38 at the turn) is structured as the toner chamber 31. An internal space under the toner chamber 31, that is a lower internal space from the supply roller upper wall portion 38 to the lower end portion of the developing roller front-side cover wall portion 41 in a vertical direction, is structured as a developing chamber 47 that disposes therein the supply roller 32, the developing roller 33, and the layer thickness regulating blade 34.

The toner chamber 31 of each process unit 16 contains a color toner, as a developing agent. More specifically, the toner chamber 31 contains, for example, positively chargeable non-magnetic single component color toner. The yellow process unit 16Y includes yellow toner. The magenta process unit 16M includes magenta toner. The cyan process unit 16C includes cyan toner. The black process unit 16K includes black toner.

The agitator 48 for agitating the toner is provided in a lower part of the toner chamber 31. The agitator 48 includes a rotary shaft 49 rotatably supported at the side walls 51, and an agitating member 50 made of a film extending from the rotary shaft 49 in a radial direction.

In the agitator 48, as power from a motor (not shown) is inputted to the rotary shaft 49, the rotary shaft 49 is rotated. Accordingly, the agitating member 50 is rotated in the direction of the arrow (clockwise). As the agitating member 50 contacts the agitator facing wall 36 of the front wall 44 of the development casing 30 while the agitator 48 is being driven, the free end of the agitating member 50 slides relative to the agitator facing wall 36 while flexing toward a downstream side in a rotating direction of the agitating member 50. Through the agitation of the agitating member 50, the toner in the toner chamber 31 flows from the rear end portion of the agitator facing wall 36 to the developing chamber 47, as indicated by the arrow F1.

The supply roller 32 is provided at the front upper side of the developing chamber 47, along the supply roller front-side cover wall portion 40 formed in a curve under the supply roller upper wall portion 38.

The supply roller 32 includes a metallic roller shaft 32a covered with a roller portion made of a conductive sponge. The outside diameter of the supply roller 32 is formed smaller than that of the developing roller 33. The roller shaft 32a of the supply roller 32 is rotatably supported by both side walls 51 of the development casing 30. Power is transmitted from the motor (not shown) to the roller shaft 32a of the supply roller 32.

The supply roller 32 is rotated in the direction of the arrow (counterclockwise), so as to rotate in the direction opposite to the rotating direction of the developing roller 33 at a nip portion where the supply roller 32 contacts the developing roller 33.

The developing roller 33 is disposed at the front lower side in the developing chamber 47 below the supply roller 32 to face and press against the supply roller 32. The developing roller 33 is disposed so as to face the developing roller front-side cover wall portion 41 at the front side thereof, and the blade support wall 45 at the rear side thereof. The developing roller 33 is arranged such that the lower-side surface of the developing roller 33 is exposed from the development casing 30.

The developing roller 33 includes a metal roller shaft 33a covered with a roller portion made of elastic member, such as a conductive rubber material. More specifically, the roller portion of the developing roller 33 is provided by a two-tier structure of an elastic roller part and a coat layer that covers the surface of the roller part. The elastic roller part is made of conductive urethane rubber or silicone rubber including fine carbon particles. The coat layer is made of urethane rubber, urethane resin, or polyimide resin, as a main intergradient. The outside diameter of the developing roller 33 is formed smaller than that of the photosensitive drum 56. The roller shaft 33a of the developing roller 33 is rotatably supported by both side walls 51 of the development casing 30, and power from the motor (not shown) is transmitted to the roller shaft 33a. The developing roller 33 is rotated in the direction of the arrow (counterclockwise), so as to move in the same direction as the photosensitive drum 56 at a nip portion where the developing roller 33 contacts the photosensitive drum 56. During development, a developing bias is applied to the roller shaft 33a of the developing roller 33 from a power supply (not shown).

A film member 52 is provided at the developing roller front-side cover wall portion 41 and pressed against the front-side surface of the developing roller 33. The film member 52 prevents toner leakage from a gap between the front-side surface of the developing roller 33 and the developing roller front-side cover wall portion 41.

The layer thickness regulating blade 34 is provided across the entire width of the development casing 30, and disposed on a downstream side in the rotating direction of the developing roller 33 with respect to the position where the developing roller 33 and the supply roller 32 face each other. The layer thickness regulating blade 34 includes a blade body 53 made of a metal leaf spring member, and a pressing portion 54 provided at a free end of the blade body 53. The pressing portion 54 has a generally semicircular shape in cross section, and is made of insulating silicone rubber.

The blade body 53 is joined on the upper surface of the blade support wall 45 at its proximal end, and disposed such that the free end of the blade body 53 extends frontward from the blade support wall 45 and faces the upper-side surface of the developing roller 33.

A sponge material (not shown) is provided on the upper surface (toward the guide wall 46) at the free end of the blade body 53. The free end of the guide wall 46 makes contact with the sponge material from above. This structure prevents the toner, which is scraped off the developing roller 33, from entering between the guide wall 46 and the layer thickness regulating blade 34 and accumulating on the upper side of the layer thickness regulating blade 34.

The pressing portion 54 is provided on the bottom surface at the free end of the blade body 53, and is pressed against the upper-side surface of the developing roller 33 by elasticity of the blade body 53.

In the above-described arrangement, the upper-side surface of the developing roller 33 makes contact with the supply roller 32 at the front side and the pressing portion 54 of the layer thickness regulating blade 34 at the rear side at a distance from the nip portion between the developing roller 33 and the supply roller 32. Thus, the upper-side surface of the developing roller 33 makes contact with the toner at a clearance between the nip portion with the supply roller 32 and the contact part with the pressing portion 54.

When the toner contained in the toner chamber 31 flows from the rear end portion of the agitator facing wall 36 toward the developing chamber 47 by the agitation of the agitating member 50, the toner is supplied to the developing roller 33 through the rotation of the supply roller 32 while being positively charged by the friction between the supply roller 32 and the developing roller 33. At this time, as the supply roller 32 and the developing roller 33 rotate in the same direction so as to move in opposite directions at the nip portion therebetween, the toner supplied from the supply roller 32 to the developing roller 33 is efficiently charged, leading to favorable development. Further, the toner that was not transferred to the photosensitive drum 56 and has remained on the developing roller 33 can be favorably removed by the supply roller 32.

The toner supplied to the developing roller 33 and frictionally charged enters between the pressing portion 54 of the layer thickness regulating blade 34 and the developing roller 33 while the developing roller 33 is rotating. The toner is carried on the developing roller 33 as a thin layer whose thickness has been uniformly regulated.

Flows of the toner are formed in the developing chamber 47. More specifically, a first flow F1 of the toner from the toner chamber 31 toward the developing chamber 47, through the rear end portion of the agitator facing wall 36, by the agitation of the agitating member 50, and a second flow F2 of the toner from the supply roller 32 to the developing roller 33 by the rotation of the supply roller 32, are formed in the developing chamber 47, during development. A third toner flow F3 is formed to return the toner, which is scraped off the developing roller 33 by the layer thickness regulating blade 34, to the toner chamber 31 along the guide wall 46, by the rotation of the developing roller 33.

The toner flowing along the third flow F3 is entered into the toner chamber 31 by the agitator 48 rotating in the same direction as the third toner flow F3. After the toner is agitated in the toner chamber 31, the toner again flows toward the developing chamber 47, from the rear end portion of the agitator facing wall 36, as the first flow F1. Thus, in each developing unit 20, the toner is favorably circulated during development.

Each photosensitive drum unit 21 is detachably attached to the main casing 2, and includes a photosensitive drum 56, as an electrostatic latent image carrier, and a scorotron charger 57 in a drum casing 55. The photosensitive drum 56 is disposed facing the developing roller 33.

The drum casing 55 is integrally formed with a drum accommodating portion 58, and a backup plate portion 59. The drum accommodating portion 58 is a substantially rectangular frame having an opening therethrough in a top to bottom direction. The backup plate portion 59 extends upward from the drum accommodating portion 58 and receives the cover wall 37 of the development casing 30.

The photosensitive drum 56 includes a metal cylindrical body made of, for example, aluminum, which is coated with a photosensitive layer of an organic photosensitive member having polycarbonate as the main ingredient. The outside diameter of the photosensitive drum 56 is formed larger than that of the developing roller 33. In this embodiment, the outside diameter of the photosensitive drum 56 is set to approximately 30 mm. The photosensitive drum 56 is rotatably supported by both side walls of the drum accommodating portion 58, via a support shaft 60 as an axis. Power is transmitted from a motor (not shown) to the photosensitive drum 56, via a gear mechanism provided at one end thereof. The photosensitive drum 56 is rotated about the support shaft 60 in the direction of the arrow (clockwise) so as to rotate in the same direction as the running direction of the endless belt 67, at a nip portion where the photosensitive drum 56 contacts the endless belt 67.

The scorotron charger 57 is fixed to the rear wall of the drum accommodating portion 58 with a predetermined distance between the rear side of photosensitive drum 56 and the scorotron charger 57. The charger 57 is a positively charging scorotron charger that generates a corona discharge from a charging wire, such as a tungsten wire. The scorotron charger 57 is disposed so as to positively and uniformly charge the surface of the photosensitive drum 56 through application of a voltage from a power supply (not shown).

The surface of the photosensitive drum 56 is uniformly and positively charged by the scorotron charger 57 while the photosensitive drum 56 is rotating. Thereafter, in accordance with the rotation of the photosensitive drum 56, the laser beam from the scanner unit 19 scans at a high speed across the surface of the photosensitive drum 56, to form an electrostatic latent image on the surface of the photosensitive drum 56, based on image data. Then, as the toner, which is carried on the developing roller 33 and is positively charged, is brought into confrontation with the photosensitive drum 56, the toner is electrically moved to and carried on parts of the photosensitive drum 56 selectively exposed to the laser beam where the potential level is lower than the remaining part of the photosensitive drum 56 surface that remains uniformly positively charged. Thus, a visible toner image is formed on the photosensitive drum 56 and a reverse image developing is completed. The visible toner image of each color is thus formed on the photosensitive drum 56.

Each drum unit 21 is disposed on a substantially same position in the vertical direction. In other words, the drum units 21 are disposed so as to align with each other in the horizontal direction, as shown in FIG. 1. The photosensitive drum 56 overlaps with the developing roller 33 of the developing unit 20 in the vertical direction and is disposed to contact the developing roller 33.

The belt transfer section 17 is disposed in the main casing 2 opposite to each developing unit 20, with respect to each photosensitive drum 56 disposed in the horizontal direction, as shown in FIG. 1. The belt transfer section 17 includes a drive roller 65, a driven roller 66, the endless belt 67, and transfer rollers 68. The drive roller 65, the driven roller 66, and transfer rollers 68 function as a support roller.

The driven roller 66 is disposed further forward than the photosensitive drum 56 in the yellow process unit 16Y. The drive roller 65 is disposed further rearward than the photosensitive drum 56 in the black process unit 16K.

The endless belt 67 is formed of a conductive resin, such as polycarbonate and polyimide, in which conductive particles, for example, carbon particles, are dispersed. The endless belt 67 is stretched between the drive roller 65 and the driven roller 66. The endless belt 67 is disposed so as to make contact with the photosensitive drum 56 of each process unit 16 at its outer contact surface.

As the drive roller 65 is driven, the driven roller 66 is rotated, and the endless belt 67 is moved around between the drive roller 65 and the driven roller 66 in the counterclockwise direction so as to rotate in the same direction as the photosensitive drum 56 of each process unit 16 at the contact surface.

The transfer rollers 68 are provided inside the endless belt 67 so as to face the respective photosensitive drum 56 of each process unit 16, with the endless belt 67 interposed between the transfer rollers 68 and the photosensitive drums 56. The transfer roller 68 includes a metal roller shaft (transfer roller support shaft) 68A covered with a roller portion formed of elastic member, such as conductive rubber material. The transfer rollers 68 are provided rotatable in the counterclockwise direction so as to rotate in the same direction as the endless belt 67 at the contact surface between the transfer rollers 68 and the endless belt 67. During image transfer, a predetermined voltage is applied by a power source (not shown) in a direction where a toner image carried on the photosensitive drum 56 is transferred onto the sheet 3, and an appropriate transfer bias is applied in between the transfer rollers 68 and the photosensitive drum 56 by the constant current control.

The sheet supplied from the sheet feeding unit 4 is fed by the conveying rollers 14 and passes between the photosensitive drum 56 of each process unit 16 and the endless belt 67 stretched between the drive roller 65 and the driven roller 66. At this time, the toner image formed on each photosensitive drum 56 of the process units 16 according to colors is sequentially transferred on the sheet 3. Thus, the color image is formed on the sheet 3.

More specifically, for example, as a yellow toner image formed on the photosensitive drum 56 of the yellow process unit 16Y is transferred onto the sheet 3, a magenta toner image formed on the photosensitive drum 56 of the magenta process unit 16M is then transferred onto the sheet 3 on which the yellow toner image has been transferred. A cyan and black toner images formed in the cyan and black process unit 16C, 16K, respectively are similarly transferred onto the sheet 3. Thus, the color image is formed on the sheet 3.

The fixing section 18 is provided downstream of the process units 16 and the belt transfer section 17 in the sheet feeding direction and behind the process units 16 and the belt transfer section 17. The fixing section 18 includes a heat roller 70 and a pressure roller 69. The heat roller 70 is made of a metal tube on which a release layer is formed, and includes a halogen lamp along its axial direction. The surface of the heat roller 70 is heated to a fixing temperature by the halogen lamp. The pressure roller 69 is provided so as to press against the heat roller 70.

The color image transferred onto the sheet 3 is thermally fixed to the sheet 3 in the fixing section 18 while the sheet 3 passes through between the heat roller 70 and the pressure roller 69.

Figure 3:
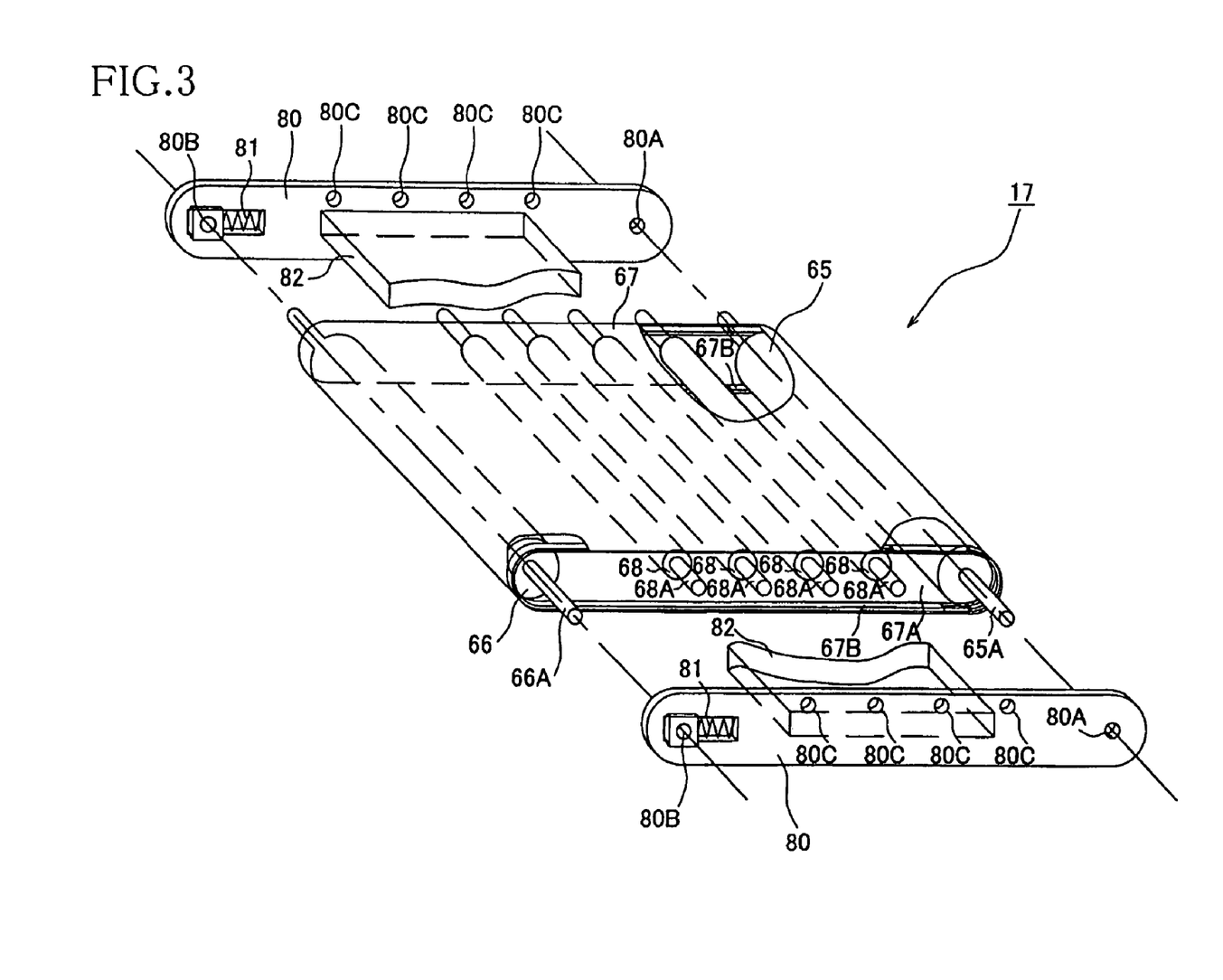
FIG. 3 is a perspective view of a belt transfer section of the printer.

The belt transfer section 17 will be described in detail below with reference to FIG. 3. As shown in FIG. 3, the endless belt 67 of the belt transfer section 17 is supported by the drive roller 65, the driven roller 66, and four transfer rollers 68. Each of the rollers 65, 66, 68 are held and positioned by two side plates 80 disposed on end sides of the rollers 65, 66, 68. More specifically, each roller 65, 66, 68 is provided with a drive roller support shaft 65A, a driven roller support shaft 66A, and a transfer roller support shaft 68A, respectively, for supporting the relevant roller 65, 66, 68. Each support shaft 65A, 66A, 68A is inserted into an insertion hole 80A, 80B, 80C, respectively formed on the side plates 80 and rotatably supported by the side plates 80. Each insertion hole 80A-80C functions as a bearing for each support shaft 65A, 66A, 68A, respectively.

Two side plates 80 are positioned relative to each other by a crossover plate 82 that passes through inside the ring-shaped endless belt 67

The insertion hole 80B into which the driven roller support shaft 66A is inserted is movably supported by a spring 81 in the side plates 80. When the spring 81 contracts, an elastic force is acted in a direction that moves the drive roller 65 and the driven roller 66 away from each other. The endless belt 67 is set to such a length that the springs 81 are slightly contracted with the driven roller support shaft 66A inserted into the insertion holes 80B. With such a structure, a proper tension is applied to the endless belt 67 by the elastic force of the springs 81. Thus, slack in the endless belt 67 is prevented.

Formed on each inner end surface of the endless belt 67 along the running direction thereof is a projection 67B that prevents the endless belt 67 from coming off the rollers 65, 66, 68.

A length of the driven roller 66 and the transfer rollers 68 contacting an inner surface 67A of the endless belt 67 in the width direction of the endless belt 67 is slightly shorter than that of the drive roller 65 contacting the inner surface 67A in the width direction of the endless belt 67. The driven roller 66 and the transfer rollers 68 do not contact the projection 67B of the endless belt 67. Only the drive roller 65 contacts the projection of the endless belt 67.

Figure 4A:
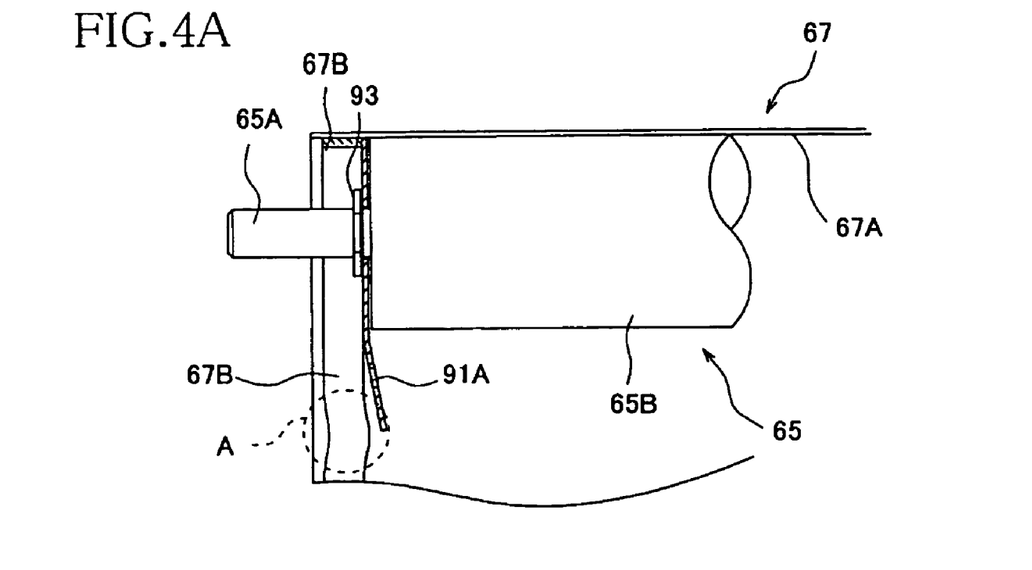
FIGS. 4A and 4B are top and side views, respectively, of a portion of the belt transfer section, according to a first embodiment of the invention, where a drive roller and a projection formed on an endless belt contact each other.
Figure 4B:
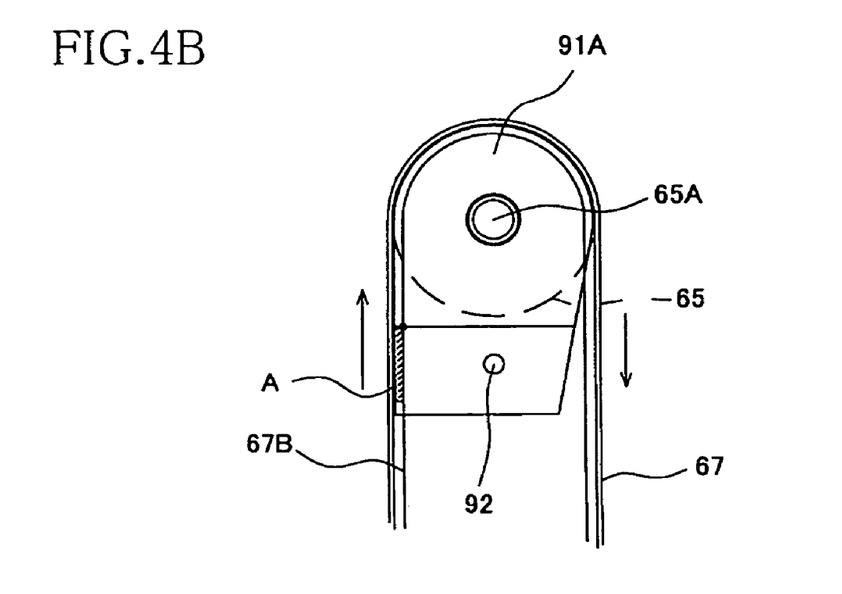

Referring to FIGS. 4A and 4B, an area near a contact portion between the drive roller 65 and the projection 67 will be described in detail below.

As shown in FIG. 4A, a guide member (guide portion) 91A is formed of, for example, a plastic thin plate that is disposed on a side surfaces of a body 65B of the drive roller 65 where the support shaft 65A is positioned. A surface of the guide member 91A is treated with fluorine to reduce frictional resistance. As shown in FIG. 4B, the guide member 91A is formed into a shape that includes a substantially semicircle shape and a substantially rectangle shape that are smoothly connected. The semicircular portion of the guide member 91A is disposed between the body 65B of the drive roller 65 and the projection 67B, so that the projection 67B does not directly contact the body 65B.

The guide member 91A is provided with a hole into which the drive roller support shaft 65A is inserted. With the support shaft 65A inserted into the hole of the guide member 91A, an engagement member 93, such as a stop ring, is fitted over the support shaft 65A, so that the guide member 91A is placed in position. At this time, the drive roller 65 is rotatable independently of the guide member 91A, as shown in FIG. 4A.

The rectangular portion of the guide member 91A is bent inwardly as shown in FIG. 4A toward a side opposite to the projection 67B (i.e., toward an interior portion of the drive roller 65). In this condition, a stopper member 92, such as a pin fixed on the side plate 80, is inserted into a hole formed on the rectangular portion of the guide member 91A. Accordingly, the guide member 91A is not rotated about the drive roller support shaft 65A.

As meandering occurs, for example, at a circled portion A of the projection 67B in FIG. 4A while the endless belt 67 is running, the portion A of the projection 67B smoothly contacts the surface of the guide member 91A, because the guide member 91A is bent, in accordance with the movement of the endless belt 67, as shown in FIG. 4B. The guide member 91A is also positioned (to the left in FIG. 4B) toward an upstream side of the projection 67B where the projection 67B first contacts the guide member 91A. The meandering occurring at the portion A is corrected while the projection 67B contacts the surface of the guide member 91A.

In the thus structured printer 1, the guide member 91A is a separate member from the body 65B of the drive roller 65, and fixedly disposed between the body 65B of the drive roller 65 and the projection 67B. Therefore, even when a force is externally applied to the endless belt 67 during its running, the guide member 91A, which is nonrotatably disposed between the body 65B of the drive roller 65 and the projection 67B, prevents the projection 67B from running onto the drive roller 65.

The guide member 91A is formed of a thin plate made of; for example, plastic material. Therefore, when the guide member 91A flexes, the guide member 91A corrects the skew or meandering of the endless belt 67 by the application of the reaction force to push back the projection 67B into a normal condition. Thus, the projection 67B is prevented from running onto the drive roller 65.

An upstream end of the guide member 91A in the running direction of the endless belt 67 is gently bent or curved toward a side opposite to a side in which the guide member 91A contacts the projection 67B as shown in FIG. 4A (i.e., toward the interior portion of the drive roller 65). Therefore, even when the meandering or skew of the endless belt 67 occurs in the endless belt 67, the projection 67B makes smooth contact with the thin plate of the guide member 91A. Thus, loads applied to the guide member 91A and the projection 67B are reduced. With the guide member 91A structured as described above, problems associated with the belt transfer section 17 are reduced.

In the first embodiment, the guide member 91A is formed such that an end of the guide member 91A disposed on an upstream side in the running direction of the endless belt 67 is foldable toward a side opposite to a side in which the guide member 91A contacts the projection 67B. However, the guide member 91A may be formed, for example, to extend straightly in the running direction of the endless belt 67. In this case, even when meandering or skew of the endless belt 67 occurs, it is corrected with the reaction force applied to the projection 67 when the guide member 91A flexes by contacting the projection 67B.

In the first embodiment, the guide member 91A is formed of the plastic thin plate. However, the material of the guide member 91A is not limited to plastic, but metallic material, such as an aluminum plate, or paper material, such as a cardboard, or wood material can be used.

In the first embodiment, the guide member 91A is fixed by the drive roller support shaft 65A and the stopper member 92.

Figure 5:
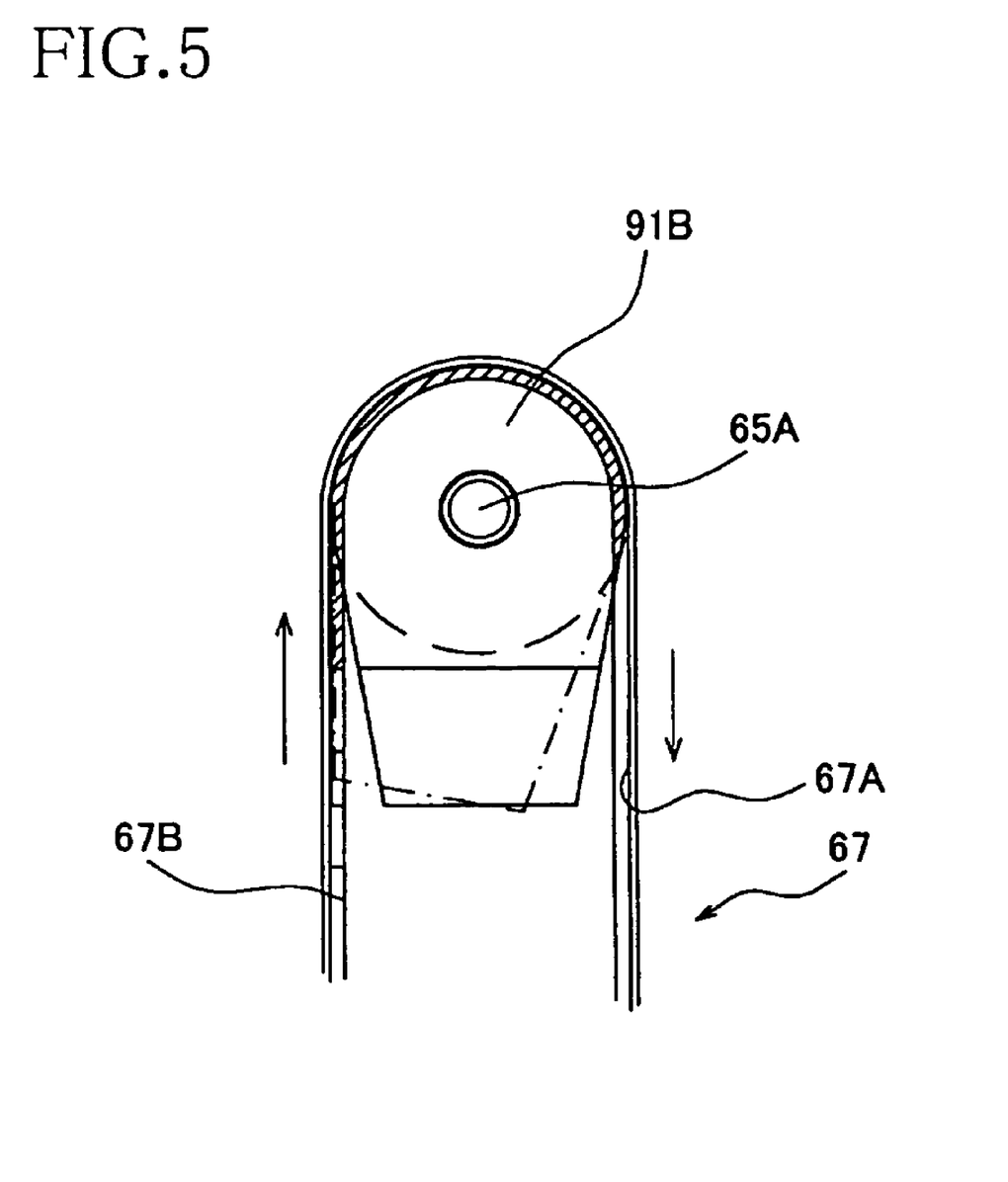
FIG. 5 is a side view of a portion of the belt transfer section, according to a modification of the first embodiment, where the drive roller and the projection formed on the endless belt contact each other.

However, as shown in FIG. 5, a guide member 91B may be supported only by the drive roller support shaft 65A. More specifically, the guide member 91B is moved to a position where an end of the guide member 91B contacts the projection 67B, as shown by dot-dash lines in FIG. 5, by frictional force generated between the guide member 91B and the drive roller 65 while the endless belt 67 is running. At the position, the guide member 91B is non-rotatably fixed by the drive roller support shaft 65A and the inner surface 67A of the endless belt 67.

For example, as the paper jam occurs and the endless belt 67 is rotated in the opposite direction, the guide member 91B is moved to a position where an opposite end (right side end in FIG. 5) of the guide member 91B contacts the opposite inner surface 67A. In other words, regardless of the running direction of the endless belt 67, the projection 67B of the endless belt 67 contacts the guide member 91B at an upstream side of the drive roller 65 in the running direction of the endless belt 67 where the meandering or skew in the endless belt 67, if any, is corrected. After the meandering or skew in the endless belt 67 is corrected, the running endless belt 67 contacts the body 65B of the drive roller 65. Thus, the endless belt 67 runs properly with the meandering or skew in the endless belt 67 corrected.

Figure 6A:
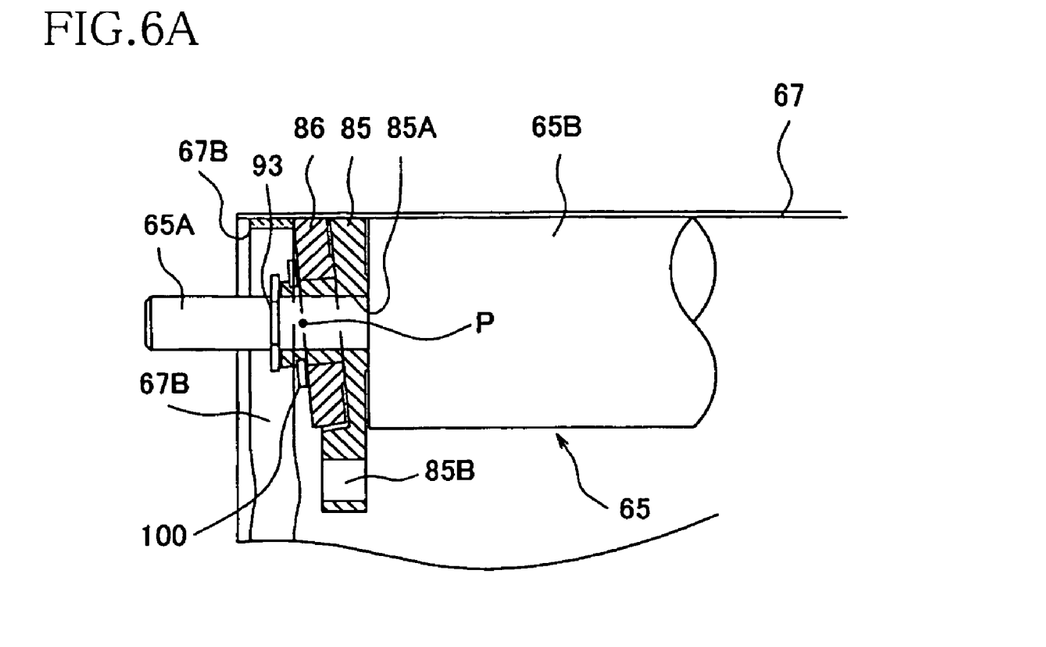
FIGS. 6A and 6B are top and side views, respectively, of a portion of the belt transfer section, according to a second embodiment of the invention, where a drive roller and a projection formed on an endless belt contact each other.
Figure 6B:
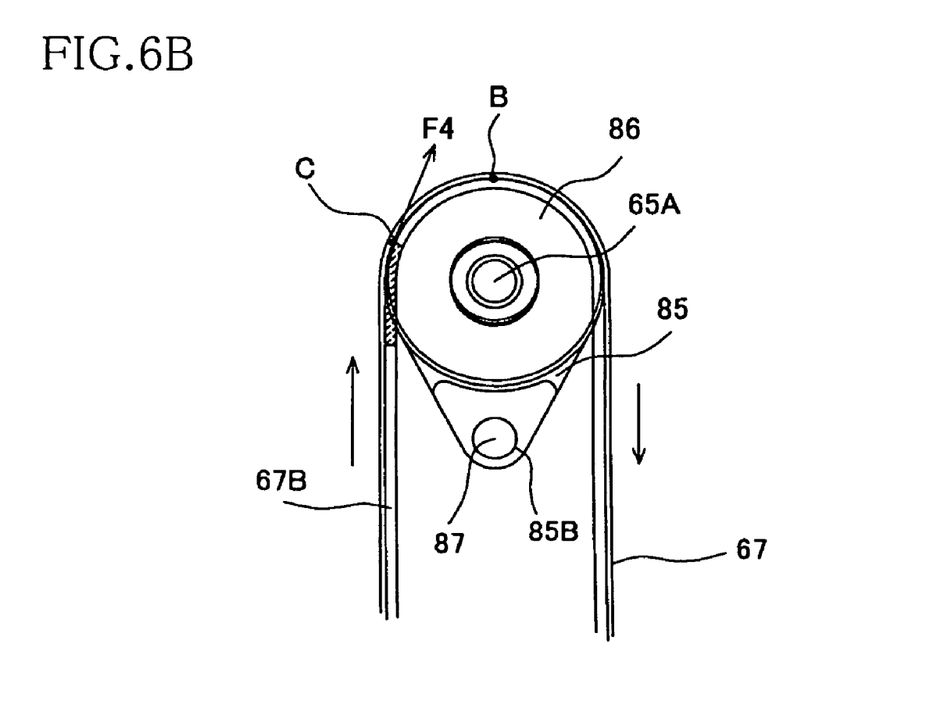

The second embodiment will be described below. Differences between the printer 1 according to the first and the second embodiment are a support member 85 disposed adjacent to the drive roller 65 and a peripheral structure of the drive roller 65, so that similar reference numerals denote similar elements and detailed description thereof with respect to the second embodiment is omitted.

With reference to FIGS. 6A and 6B, the drive roller 65 and the periphery of the drive roller 65 are described below. In the second embodiment, the support member 85 (comprising a guide portion together with a rotating member 86 which will be described below) is formed with insertion holes 85A, 85B. The support member 85 is fixedly positioned by the insertion holes 85A, 85B. More specifically, with the drive roller support shaft 65A inserted into the insertion hole 85A, an engagement member 93, such as a stop ring, is fitted over the support shaft 65A. Thus, the support member 85 is placed in position. As shown in FIG. 6B, a stopper member 87, such as a pin fixed on the side plate 80, is fitted into the insertion hole 85B, to prevent the support member 85 from pivotally rotating about the support shaft 65A.

A rotating member 86 is rotatably disposed on the support member 85. The rotating member 86 has a rotating axis that does not match with a rotating axis of the drive roller 65. An engagement member 100, such as a stop ring, is fitted on the drive roller support shaft 65A. Thus, the rotating member 86 is placed in position. The rotating axis of the rotating member 86 is disposed, for example, at an angle of about 5 degrees, with respect to the rotating axis of the drive roller 65. However, the rotating axes of the rotating member 86, the drive roller 65, and the driven roller 66 are disposed on the same plane.

The diameter of the rotating member 86 is substantially equal to or slightly smaller (for example, about 5%) than that of the body 65B of the drive roller 65. The rotating axis of the thus structured rotating member 86 is disposed at an angle. Accordingly, when the meandering or skew does not occur in the endless belt 67, the projection 67B and the rotating member 86 first contact each other at the point B in FIG. 6B, where the endless belt 67 is turned 90 degrees by the drive roller 65. When the meandering or skew occurs in the endless belt 67, the projection 67B and the rotating member 86 contact each other, for example, at the point C in FIG. 6B.

The rotating member 86 has a tapered outer surface to contact the inner surface of the endless belt 67, not at a point but on a parallel face-to-face plane. The angle of the taper is about 5 degrees in order to correspond to the angle of the rotating axis of the rotating member 86, with respect to the rotating axis of the drive roller 65. More specifically, the rotating member 86 is shaped into a cone with a tip portion of the cone being cut out. The rotating member 86 is mounted on the drive roller support shaft 65A, such that the center P, as shown in FIG. 6A, in the larger diameter of the rotating member 86 on the bottom side of the rotating member 86 (left side in FIG. 6A) is disposed on a rotating axis of the drive roller 65, that is, on the axis of the drive roller support shaft 65A.

As a comparison, with reference to FIGS. 7A and 7B, the drive roller 65 mounting thereon a rotating member 95 whose rotating axis is concentric with the rotating axis of the drive roller 65, will be described below.

Figure 7A:
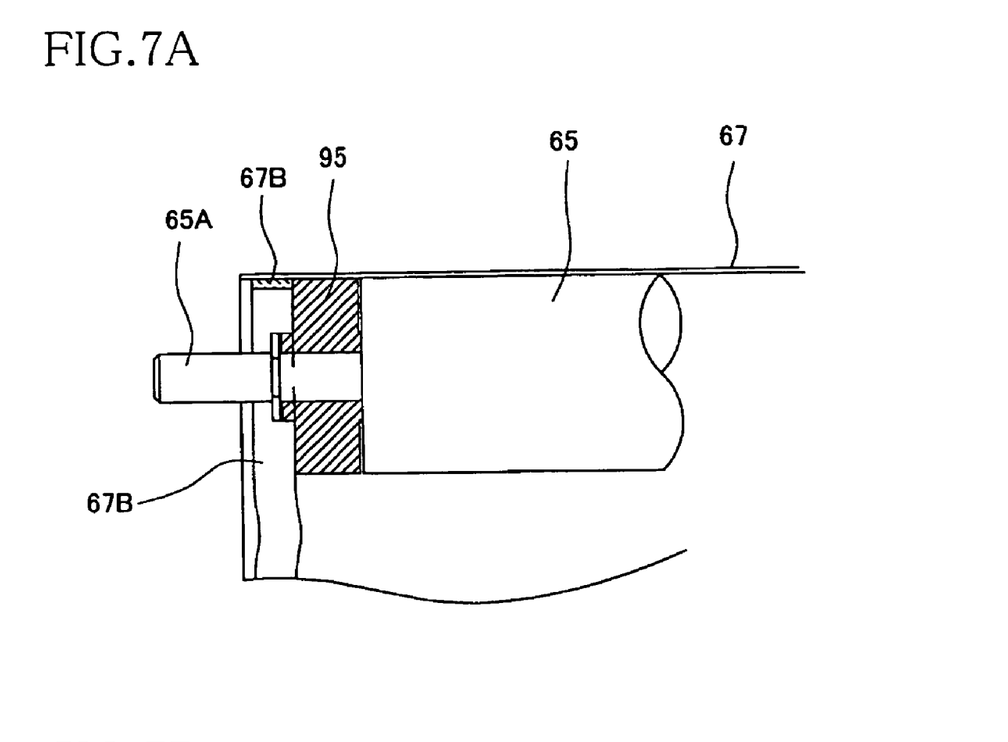
FIGS. 7A and 7B are top and side views respectively, of a portion of the belt transfer section for comparison with that according to the second embodiment, where a drive roller and a projection formed on an endless belt contact each other.
Figure 7B:
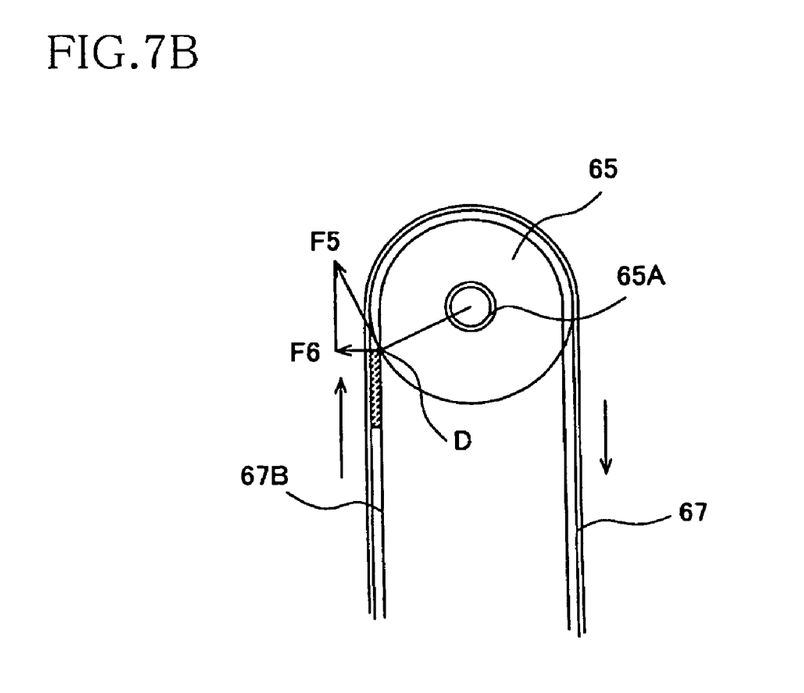

As shown in FIG. 7A, the rotating member 95 is rotatably mounted on the drive roller support shaft 65A on each end side of the drive roller 65. The rotating member 95 and the projection 67B contact each other at their surfaces rather than at a point. When the meandering or skew occurs in the endless belt 67, the rotating member 95 and the projection 67B contact each other, for example, at the point D in FIG. 7B.

At this time, force F5 in a tangential direction of the drive roller 65 is applied to the endless belt 67. As a component force of the force F5, force F6 is generated that makes the projection 67B run onto the drive roller 65 (rotating member 95).

As the rotating member 86 is disposed at an angle with respect to the rotating axis of the drive roller 65, as shown in FIG. 6A, the timing when the rotating member 86 and the projection 67B contact each other is delayed or late, as compared with a case where the rotating member 86 is not disposed at an angle with respect to the rotating axis of the drive roller 65. For example, when the rotating member 86 and the projection 67B contact first at the point C in FIG. 6B, force F4 in the tangential direction of the derive roller 65 is applied to the projection 67B. As the timing when the rotating member 86 and the projection 67B contact is delayed or late, such force that makes the projection 67B run onto the drive roller 65 or rotating member 86 is rarely exerted, due to the direction of force F4 directed toward the running direction of the endless belt 67.

The printer 1 according to the second embodiment includes the rotating member 86 and the support member 85. The rotating member 86 has a diameter substantially the same as that of the body 65B. The rotating member 86 is disposed concentrically with the body 65B of the drive roller 65 between the body 65B and the projection 67B. The support member 85 is separately provided from the body 65B of the drive roller 65. The support member 85 rotatably supports the rotating member 86 at an angle such that the projection 67B gradually approaches the rotating member 86 as the endless belt 67 moves in the running direction thereof. In other words, distance between the projection 67B and the bottom surface of the rotating member 86 becomes gradually shorter toward the running direction of the endless belt 67.

When the rotating member 95 having the rotating axis that matches with that of the body 65B, is used, a component force that makes the projection 67B run onto the rotating member 95 is generated between the projection 67B and the rotating member 95, so that the projection 67B is likely to run onto the drive roller 65 (rotating member 95). To prevent the generation of the component force that makes the projection 67B run onto the rotating member 95, the rotating member 86 according to the second embodiment is disposed at such an angle that makes the projection 67B gradually approach the rotating member 86 as the endless belt 67 moves in the running direction thereof. With such a structure, the projection 67B and the rotating member 86 contact each other at a relatively delayed or late timing.

In the thus structured belt transfer section 17, even when external force is applied to the endless belt 67 while the endless belt 67 is running, the projection 67B of the endless belt 67 is prevented from running onto the drive roller 65.

The endless belt 67 is structured to turn at least 90 degrees by the drive roller 65. The rotating member 86 is disposed at such an angle so as to make the projection 67B contact the rotating member 86 at a position where the endless belt 67 is turned 90 degrees by the drive roller 65. Therefore, the component force exerted in the direction in which the projection 67B runs onto the rotating member 86 is effectively prevented. Accordingly, the projection 67B of the endless belt 67 is prevented from running onto the drive roller 65.

To make contact with the inner surface of the endless belt 67, not at a point but on a parallel face-to-face plane, the rotating member 86 has a tapered outer surface, with the taper angle of about 5 degrees corresponding to the angle of the rotating axis of the rotating member 86 with respect to the rotating axis of the drive roller 65. Thus, damage on the inner surface of the endless belt 67 is prevented.

As a structure that effectively prevents the generation of the component force in a direction that the projection 67B runs onto the guide member 91A, the rotating axes of the rotating member 86, the drive roller 65, and the driven roller 66 are disposed on the same plane in the second embodiment. However, different structures may be employed, as long as the projection 67B gradually approaches the rotating member 86 as the endless belt 67 moves in its running direction.

The printer 1 according to the first and second embodiments is a tandem color laser printer in which the toner image is directly transferred from each photosensitive drum 56 to the sheet 3. However, a tandem color laser printer of an intermediate transfer type may be used in which the toner image of each color is once transferred from respective photosensitive drum to an intermediate transfer belt and then on the sheet 3 by one operation. In this case, the endless belt structured as the intermediate transfer belt carries a recording material (toner) for forming an image onto the sheet 3 (recording medium).

While the invention has been described with reference to the embodiments, it is to be understood that the invention is not restricted to the particular forms shown in the foregoing embodiments. Various modifications and alterations can be made thereto without departing from the scope of the invention, as set forth in the appended claims.

The invention may be applied to a laser printer in which a photosensitive member is constituted by an endless belt, as well as to printers other than a laser type, such as LED printers, provided with a conveying belt that conveys a recording medium, an intermediate transfer belt, or an endless belt that functions as a photosensitive belt.

For example, the embodiments are described in conjunction with the printer 1. However, the invention is not limited to printers, but may also be applied to other image forming apparatus, such as a facsimile machine and a copying machine.

What is claimed is:

1. A belt device, comprising:
   an endless belt having a projection on an inner surface of the endless belt, the projection extending parallel to a running direction of the endless belt; and a support roller having a guide member that contacts the projection, the support roller supporting the endless belt so as to run the endless belt, wherein the guide member is separately provided from the support roller and non-rotatably supported between the support roller and the projection, the guide member having an inner face and an outer face and contacting the projection only at the outer face and contacting the support roller at the inner face so as to separate the projection and support roller in an axial direction relative to the rotational axis of the support roller.

2. The belt device according to claim 1, wherein the guide member is formed of a flexible material.

3. The belt device according to claim 1, wherein an upstream portion of the guide member in the running direction of the endless belt is bent toward a side opposite to the projection.

4. The belt device according to claim 3, wherein the side opposite to the projection is toward an interior portion of the support roller.

5. The belt device according to claim 3, wherein the guide member is positioned toward an upstream side of the endless belt where the projection first contacts the guide member.

6. The belt device according to claim 1, wherein a downstream portion of the guide member that is downstream from an upstream portion of the guide member where the projection first contacts the guide member in the running direction of the endless belt is disposed on a rotating axis of the support roller.

7. The belt device according to claim 1, wherein the guide member includes a substantially semicircle shape and a substantially rectangle shape wherein the semicircular shape of the guide member is disposed between the support roller and the projection.

8. The belt device according to claim 1, wherein the guide member is positioned toward an upstream side of the endless belt where the projection first contacts the guide member.

9. A belt device, comprising:
an endless belt having a projection on an inner surface of the endless belt, the projection extending parallel to a running direction of the endless belt; and
a support roller having a guide member that contacts the projection, the support roller supporting the endless belt so as to run the endless belt, wherein the guide member is separately provided from the support roller and is movable toward an upstream side of the endless belt where the projection first contacts the guide member, the guide member contacts both the projection and the support roller so as to separate the projection and the support roller in an axial direction relative to the rotational axis of the support roller, the guide member being non-rotatably fixed by the support roller and the belt after being moved toward the upstream side of the endless belt.

10. The belt device according to claim 9, wherein an upstream portion of the guide member in the running direction of the endless belt is bent toward a side opposite to the projection.

11. The belt device according to claim 9, wherein a downstream portion of the guide member that is downstream from an upstream portion of the guide member where the projection first contacts the guide member in the running direction of the endless belt is disposed on a rotating axis of the support roller.

* * * * *